United States Patent
Takeda et al.

(10) Patent No.: US 10,925,019 B2
(45) Date of Patent: Feb. 16, 2021

(54) USER TERMINAL AND RADIO COMMUNICATION METHOD

(71) Applicant: NTT DOCOMO, INC., Tokyo (JP)

(72) Inventors: Daiki Takeda, Tokyo (JP); Hiroki Harada, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/346,320

(22) PCT Filed: Nov. 1, 2017

(86) PCT No.: PCT/JP2017/039624
§ 371 (c)(1),
(2) Date: Apr. 30, 2019

(87) PCT Pub. No.: WO2018/084209
PCT Pub. Date: May 11, 2018

(65) Prior Publication Data
US 2020/0059873 A1 Feb. 20, 2020

(30) Foreign Application Priority Data
Nov. 2, 2016 (JP) ................................. 2016-215688

(51) Int. Cl.
*H04W 56/00* (2009.01)
*H04J 11/00* (2006.01)
(Continued)

(52) U.S. Cl.
CPC ....... *H04W 56/001* (2013.01); *H04J 11/0076* (2013.01); *H04L 5/0048* (2013.01); *H04L 27/2613* (2013.01)

(58) Field of Classification Search
CPC . H04W 56/001; H04J 11/0076; H04L 5/0048; H04L 27/2613
(Continued)

(56) References Cited

U.S. PATENT DOCUMENTS

| 2008/0205351 A1* | 8/2008 | Lindoff | H04L 27/0008 370/336 |
| 2018/0048445 A1* | 2/2018 | Jung | H04W 56/0005 |

(Continued)

OTHER PUBLICATIONS

International Search Report issued in PCT/JP2017/039624 dated Jan. 16, 2018 (1 page).
(Continued)

*Primary Examiner* — Sai Ming Chan
(74) *Attorney, Agent, or Firm* — Osha Bergman Watanabe & Burton LLP

(57) ABSTRACT

Even when different numerologies from those of legacy LTE systems are used, synchronization signals are appropriately transmitted and/or received. A user terminal includes: a reception section that receives a first synchronization signal and a second synchronization signal mapped on predetermined resources; and a control section that controls synchronization processing based on the first synchronization signal and the second synchronization signal, and spacings of the first synchronization signal and the second synchronization signal at which the first synchronization signal and the second synchronization signal are mapped on subcarriers are different.

15 Claims, 9 Drawing Sheets

(51) Int. Cl.
*H04L 5/00* (2006.01)
*H04L 27/26* (2006.01)

(58) Field of Classification Search
USPC .......................................................... 370/329
See application file for complete search history.

(56) References Cited

U.S. PATENT DOCUMENTS

2018/0110019 A1* 4/2018 Ly ....................... H04L 27/2692
2018/0249400 A1* 8/2018 Harada ................ H04J 11/0079
2018/0309533 A1* 10/2018 Yoshimoto .......... H04L 27/2613

OTHER PUBLICATIONS

Written Opinion of the International Searching Authority issued in PCT/JP2017/039624 dated Jan. 16, 2018 (5 pages).
LG Electronics; "Numerology for NR Synchronization Signal"; 3GPP TSG RAN WG1 Meeting #86bis, R1-1609265; Lisbon, Portugal; Oct. 10-14, 2016 (7 pages).
3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; Mar. 2010 (149 pages).

\* cited by examiner

USER TERMINAL AND RADIO COMMUNICATION METHOD

TECHNICAL FIELD

The present invention relates to a user terminal and a radio communication method of a next-generation mobile communication system.

BACKGROUND ART

In Universal Mobile Telecommunications System (UMTS) networks, for the purpose of higher data rates and low latency, Long Term Evolution (LTE) has been specified (Non-Patent Literature 1). Furthermore, for the purpose of wider bands and a higher speed than LTE (also referred to as LTE Rel. 8 or 9), LTE-Advanced (LTE-A that is also referred to as LTE Rel. 10, 11, 12 or 13) has been specified, and successor systems of LTE (referred to as, for example, Future Radio Access (FRA), the 5th generation mobile communication system (5G), New Radio (NR), New radio access (NX), Future generation radio access (FX) or LTE Rel. 14, 15 or subsequent releases) have been also studied.

LTE Rel. 10/11 have introduced Carrier Aggregation (CA) that aggregates a plurality of Component Carriers (CCs) to obtain a wider band. A system band of LTE Rel. 8 is one unit that composes each CC. Furthermore, according to CA, a plurality of CCs of the identical radio base station (eNB: eNodeB) are configured to a user terminal (UE: User Equipment).

On the other hand, LTE Rel. 12 has introduced Dual Connectivity (DC), too, that configures a plurality of Cell Groups (CGs) of different radio base stations to a UE. Each cell group includes at least one cell (CC). DC aggregates a plurality of CCs of the different radio base stations, and therefore DC is also referred to as inter-base station CA (Inter-eNB CA).

Furthermore, according to legacy LTE systems (e.g., LTE Rel. 8 to 13), synchronization signals (a PSS or an SSS) used for an initial access operation by a user terminal, and a broadcast channel (PBCH) are allocated to a domain fixedly defined in advance. By detecting the synchronization signals by cell search, the user terminal can synchronize with a network and identify a cell (e.g., a cell ID) that the user terminal connects with. Furthermore, the user terminal can obtain system information by receiving the broadcast channel (a PBCH or an SIB) after the cell search.

CITATION LIST

Non-Patent Literature

Non-Patent Literature 1: 3GPP TS 36.300 "Evolved Universal Terrestrial Radio Access (E-UTRA) and Evolved Universal Terrestrial Radio Access Network (E-UTRAN); Overall Description; Stage 2"

SUMMARY OF INVENTION

Technical Problem

Future radio communication systems (e.g., 5G and NR) are expected to realize various radio communication services while meeting respectively different request conditions (e.g., an ultra high speed, a large volume or ultra low latency). For example, it is studied for 5G/NR to provide radio communication services that are referred to as enhanced Mobile Broad Band (eMBB), Internet of Things (IoT), massive Machine Type Communication (mMTC), Machine To Machine (M2M) and Ultra Reliable and Low Latency Communications (URLLC).

Furthermore, 5G/NR are demanded to support flexible use of numerologies and a frequency, and realize a dynamic frame configuration. The numerologies refer to, for example, communication parameters (e.g., a subcarrier spacing and a bandwidth) applied to transmission and reception of a certain signal.

However, how to control transmission and reception of communication in a case where different numerologies from those of legacy LTE systems and a plurality of numerologies are used is not determined. Although it is considered to use control methods of the legacy LTE systems as is, there is a risk in this case that it is not possible to appropriately transmit and receive signals (for example, transmit and receive synchronization signals), and there are problems that a throughput lowers and communication quality deteriorates.

The present invention has been made in light of this point, and one of objects of the present invention is to provide a user terminal and a radio communication method that can appropriately transmit and/or receive synchronization signals even when numerologies different from those of legacy LTE systems are used.

Solution to Problem

A user terminal according to one aspect of the present invention includes: a reception section that receives a first synchronization signal and a second synchronization signal mapped on predetermined resources; and a control section that controls synchronization processing based on the first synchronization signal and the second synchronization signal, and spacings of the first synchronization signal and the second synchronization signal at which the first synchronization signal and the second synchronization signal are mapped on subcarriers are different.

Advantageous Effects of Invention

According to the present invention, it is possible to appropriately transmit and/or receive synchronization signals even when numerologies different from those of legacy LTE systems are used.

DESCRIPTION OF EMBODIMENTS

Figure 1:
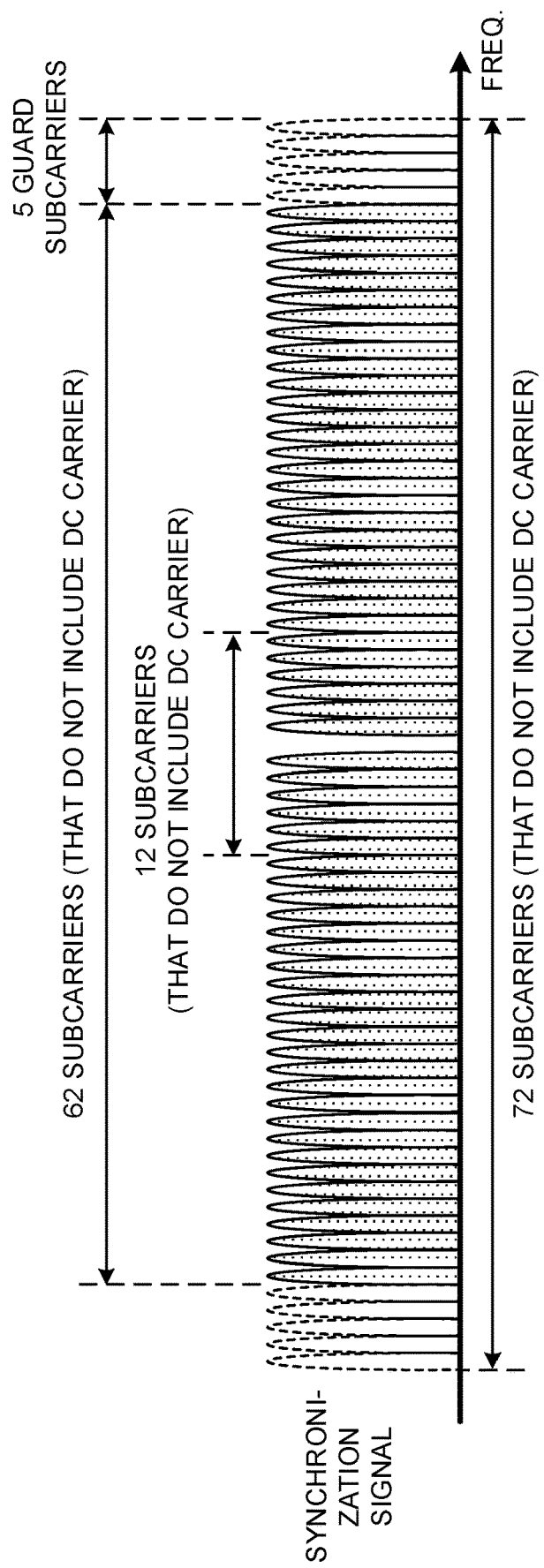
FIG. 1 is a diagram illustrating a configuration of a synchronization signal of a legacy LTE system.

It is considered that, similar to legacy LTE systems, in future radio communication systems, too, a user terminal performs detection of synchronization signals and demodulation of a channel for transmitting broadcast information as initial access processing with respect to a newly introduced carrier (also referred to as an NR carrier (cell)). For example, the user terminal can detect at least time/frequency synchronization and a cell identifier (cell ID) by detecting the synchronization signals.

The legacy LTE systems define two synchronization signals of a Primary Synchronization Signal (PSS) and a Secondary Synchronization Signal (SSS). In a case of FDD, the PSSs are transmitted in last symbols of first slots of a subframe 0 and a subframe 5. The SSSs are transmitted in second symbols from the last symbols in the same slots as those of the PSSs in the subframe 0 and the subframe 5, yet different patterns are transmitted in the subframe 0 and the subframe 5. In a case of TDD, the PSSs are transmitted in third symbols of the subframe 1 and a subframe 6, and the SSSs are transmitted in last symbols of the subframe 0 and the subframe 5. In addition, one frame (10 ms) includes the subframe 0 to a subframe 9.

On the other hand, six PRBs (one MHz) at system band centers are allocated to transmission bandwidths of the PSS and the SSS. Furthermore, the PSS and the SSS are transmitted by using 63 subcarriers, and respective subcarrier spacings are configured to same 15 kHz.

FIG. 1 is a diagram illustrating resources (subcarriers) on which synchronization signals (PSS/SSS) of an LTE system are mapped. As illustrated in FIG. 1, in a case of the synchronization signals (PSS/SSS) of the LTE system, signal sequences that compose the synchronization signals (PSS/SSS) are arranged on 62 subcarriers except a band center subcarrier (Direct Current (DC) subcarrier), and non-transmission subcarriers (guard subcarriers) of a five subcarrier width are arranged at both ends. Consequently, the synchronization signals (PSS/SSS) can be mapped on frequency resources of six PRBs (=72 subcarriers).

Furthermore, the LTE system defines 504 different physical layer cell IDs. The physical layer cell IDs are classified into 168 physical layer cell ID groups, and each group includes three specific IDs. For PSSs, three patterns are defined to detect one of the three specific IDs included in each physical layer cell ID group. Furthermore, for the SSSs, 168×2 patterns (different patterns between the subframe 0 and the subframe 5) for detection of the physical layer cell ID are defined. The PSS is composed of a Zadoff-Chu sequence of three types of lengths 63. More specifically, sequences of the sequence lengths 63 are generated by using three different root indices (the DC carrier is overwritten with 0). The SSS is composed of a sequence on which two sequences of lengths 31 are alternately mapped by using a plurality of m sequences.

Detection processing of the PSS and the SSS in the user terminal is as follows.

Known sequences of the PSS are looked up in a window (correlation processing), and a symbol boundary is detected from a peak position. One of the three specific IDs is specified from the three patterns of the highest correlation to roughly correct a frequency offset. Next, the SSS is detected. Correlation processing is performed on 168×2 patterns of the SSSs, a physical layer cell ID group is detected from the 168 patterns, and a subframe boundary between two patterns (the subframe 0 and the subframe 5) is detected. Furthermore, the frequency offset is further corrected.

By the way, it has been agreed for 5G/NR to support at least two synchronization signals (also referred to as an NR-PSS and an NR-SSS). A first synchronization signal (NR-PSS) is a synchronization signal used to detect at least a symbol boundary of an NR cell during an initial access to an NR cell. A second synchronization signal (NR-SSS) is a synchronization signal used to detect at least NR cell IDs or part of the NR cell IDs. It is considered to detect the NR-SSS based on frequency/time domains associated with an NR-PSS resource position detected first. Furthermore, it has been agreed to associate the NR-PSS, the NR-SSS and the PBCH with one subcarrier spacing in a predetermined frequency range.

It is considered for 5G/NR, too, to use synchronization signals of the legacy LTE systems. However, it is necessary for 5G/NR to assume a great frequency offset during initial access processing. When a frequency error according to 5G/NR is assumed as +/−5 ppm (or +/−10 ppm), an initial frequency offset of +/−20 kHz (or +/−40 kHz) is necessary in a case of a carrier of four GHz, and an initial frequency offset of +/−200 kHz (or +/−400 kHz) is necessary in a case of a carrier of 40 GHz. Thus, according to 5G/NR, a great frequency offset is assumed during the initial access. Furthermore, the frequency offset is predicted to significantly differ per frequency band (e.g., 4 GHz and 40 GHz). When the subcarrier spacing of 15 kHz is applied in such a situation similar to the synchronization signals (PSSs/SSSs) of the legacy LTE systems, synchronization signal detection accuracy is supposed to significantly deteriorate.

One of countermeasures for such a frequency offset includes widening subcarrier spacings of subcarriers for transmitting NR-PSSs and NR-SSSs. By widening the subcarrier spacings, it is possible to relatively reduce a frequency offset influence.

However, widening the subcarrier spacings causes a new disadvantage. When the subcarrier spacings for the NR-PSSs and the NR-SSSs are widened and then the same sequence lengths as those of the synchronization signals of the legacy LTE systems are maintained, a transmission bandwidth needs to be widened as a whole. In this case, the user terminal needs to widen an observation bandwidth (sampling rate) for detection processing of the NR-PSSs and the NR-SSSs, and therefore there is the disadvantage that a processing load (consumption power) increases.

Furthermore, when the subcarrier spacings for the NR-PSSs and the NR-SSSs are widened and, on the other hand, expansion of the transmission bandwidth is suppressed as a whole, it is necessary to shorten the sequence lengths of the NR-PSSs and the NR-SSSs. By shortening the sequence lengths, sequence correlation characteristics lower, and therefore detection characteristics at a low SINR deteriorate. Furthermore, it is difficult to prepare a greater number of patterns of synchronization signals (the NR-SSSs in particular), and it is difficult to lower a correlation between different patterns.

Hence, the inventors of the present invention have focused on that, by widening a mapping spacing of signal sequences of synchronization signals with respect to subcarriers, it is possible to obtain the same effect as that obtained by widening subcarrier spacings, and have conceived an idea of differing the mapping spacing of the signal sequences with respect to the subcarriers between the first and second synchronization signals.

The embodiment according to the present invention will be described in detail below with reference to the drawings. A radio communication method according to each embodiment may be applied alone or may be applied in combination.

In addition, in this description, at least two synchronization signals (first and second synchronization signals) scheduled to be introduced to 5G/NR are referred to as the NR-PSS and the NR-SSS. However, names thereof are not limited to these. Furthermore, resources on which the NR-PSSs and the NR-SSSs are mapped are referred to as subcarriers, yet may be referred to as frequency resources. A modulation scheme (OFDM) used by LTE classifies 12 subcarriers (180 kHz) that are neighboring at 15 kHz spacings into one block, and this one block is referred to as a Resource Block (RB). According to 5G/NR, a value other than 15 kHz may be defined for the subcarrier spacings per use frequency band.

Embodiment

The present embodiment will describe a case where first synchronization signals and second synchronization signals introduced to 5G/NR are each mapped on subcarriers at different spacings.

The mapping spacing of signal sequences of NR-PSSs that are the first signals with respect to the subcarriers is widened compared to a mapping spacing of signal sequences of the NR-SSSs that are the second synchronization signals with respect to the subcarriers.

By widening the mapping spacing of the NR-PSS signal sequences with respect to the subcarriers, it is possible to obtain the same effect as that obtained by widening subcarrier spacings, so that an effect that frequency offset tolerance is enhanced is expected. By enhancing the frequency offset tolerance of the NR-PSSs, it is possible to establish symbol synchronization by detecting the NR-PSSs, and remove the frequency offset. After the frequency offset is removed, the NR-SSSs can be detected, so that, even when the mapping spacing of the NR-SSS signal sequences with respect to the subcarriers is narrowed compared to the NR-PSSs, deterioration of detection accuracy caused by the frequency offset is reduced. Consequently, it is possible to narrow the mapping spacing of the NR-SSS signal sequences with respect to the subcarriers compared to the NR-PSSs, secure the long NR-PSS sequence lengths and generate multiple sequence patterns of low mutual correlations.

Furthermore, one aspect assumes that the NR-PSSs that are the first synchronization signals and the NR-SSSs that are the second synchronization signals are applied the same transmission bandwidth and subcarrier spacing. By applying the same transmission bandwidth and subcarrier spacing to the NR-PSSs and the NR-SSSs, it is possible to obtain an advantage that it is possible to perform signal generation processing on a radio base station side and reception detection processing on a user terminal side at a common sampling rate and with the common number of FFT points.

According to the present embodiment, it is possible to flexibly support the NR-PSSs and the NR-SSSs on a common framework (the transmission bandwidth and the subcarrier spacing) while suppressing an initial access processing load of the user terminal.

Figure 2:
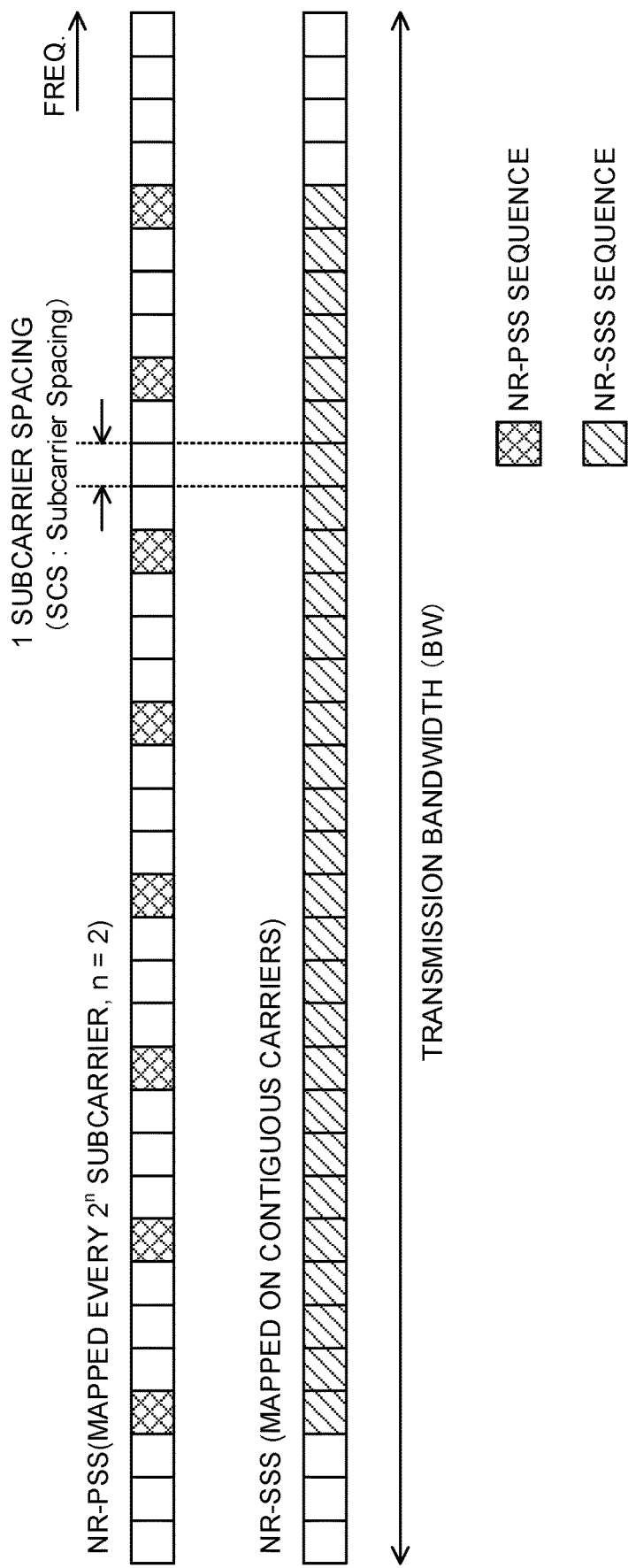
FIG. 2 is a diagram illustrating one example of a mapping method for mapping NR-PSSs and NR-SSSs on subcarriers.

FIG. 2 is a diagram illustrating one example where the NR-PSS and NR-SSS signal sequences are applied the present embodiment and are mapped on subcarriers. The NR-PSS and NR-SSS signal sequences are applied the same transmission bandwidth BW and subcarrier spacing SP. The NR-PSS signal sequences are mapped on subcarriers of the transmission bandwidth BW every $2^n$ subcarrier.

In FIG. 2, the subcarrier spacing SP is 30 kHz, and a parameter n (n>1) that defines the mapping spacing is n=2. In a case of the parameter n=2, the NR-PSS signal sequences are arranged once every four subcarrier with a spacing of three subcarriers. In response to an increase in the value of the parameter n, the mapping spacing of the signal sequences widens, and the frequency offset tolerance becomes high.

On the other hand, according to the aspect illustrated in FIG. 2, the NR-SSS signal sequences are contiguously mapped on the subcarriers of the transmission bandwidth BW. The signal sequences are contiguously mapped on the subcarriers, so that the mapping spacing of the signal sequences minimizes. As described above, the frequency offset is excluded during detection of the NR-PSSs, so that it is eventually possible to minimize an influence of the frequency offset.

In an example of mapping illustrated in FIG. 2, the number of subcarriers used for transmission is reduced to ¼ compared to a case where the signal sequences of the NR-PSSs are contiguously mapped on the subcarriers. Hence, the NR-PSS sequence length is adjusted to a sequence length of a short length that can be transmitted by ¼ of subcarriers compared to the case where the NR-PSS signal sequences are contiguously mapped on the subcarriers.

As described above, the NR-PSS is used to detect a symbol boundary of an NR cell and correct the frequency offset. To detect the symbol boundary in an observation time window corresponding to a transmission periodicity of the NR-PSSs, a mutual correlation value of a template signal and a received signal is calculated. However, taking into account that the transmission bandwidth of the NR-PSSs widens and a sampling rate becomes high, a correlation calculation amount for detection of an NR-PSS timing is considered to become very large compared to LTE. Hence, the number of patterns of the NR-PSSs may be one pattern at minimum to reduce the correlation calculation amount (the PSSs according to LTE have three patterns).

On the other hand, the NR-SSS signal sequences use the number of subcarriers that is four times compared to the NR-PSSs, and consequently can be adjusted to the sequence length whose length is four times compared to the NR-PSSs. When the NR-PSSs have the one pattern at minimum as described above, the NR-SSSs are used to detect NR cell IDs. Hence, the number of patterns of the NR-SSSs is desirably a greater number of patterns according to the number of NR cell IDs. Consequently, that it is possible to increase the NR-SSS sequence length is effective to secure a greater number of patterns.

For the parameter n, at least one value may be defined in advance by a specification per frequency band. According to the value of the parameter n, the mapping spacing of the NR-PSS signal sequences with respect to subcarriers changes. The value (absolute value) of the frequency offset can change per frequency band, and therefore an appropriate subcarrier spacing is also likely to change per frequency band.

Although the user terminal searches a frequency band to detect a synchronization signal, if the user terminal does not know the subcarrier spacing, a plurality of patterns need to be assumed, and a load increases. Hence, at least one subcarrier spacing SP may be defined by the specification, and a mapping spacing with respect to subcarriers may be determined based on the defined subcarrier spacing SP according to the parameter n. The reciprocal of the subcarrier spacing corresponds to a symbol length, and therefore the subcarrier spacing SP defined by the specification may be the subcarrier spacing corresponding to the number of FFT points.

Zadoff-Chu sequences used by the PSSs of the legacy LTE systems may be reused for the NR-PSS signal sequences. Alternatively, the NR-PSS signal sequences may the extended or simplified Zadoff-Chu sequences. Furthermore, the NR-PSS signal sequences may be sequences generated by other methods.

The number of patterns of the NR-PSS signal sequences may be one or may be a number (e.g., three) larger than one. It has been agreed that the number of physical layer cell IDs according to 5G/NR is at least 504. In a case of the number of the patterns of the NR-PSS signal sequence=1, the NR-SSS signal sequence that is another synchronization signals includes at least the number of patterns=504. Thus, the NR-PSS is formed by one pattern and the NR-SSS is formed based on the number of patterns (e.g., 504 or a number larger than 504) corresponding to the number of cell IDs, so that the role of the NR-PSS can focus on detection of a symbol timing and correction of a frequency offset. Alternatively, when the NR-PSS has the number of patterns=3, at least the number of patterns=168 needs to be prepared for the NR-SSS.

Figure 3:
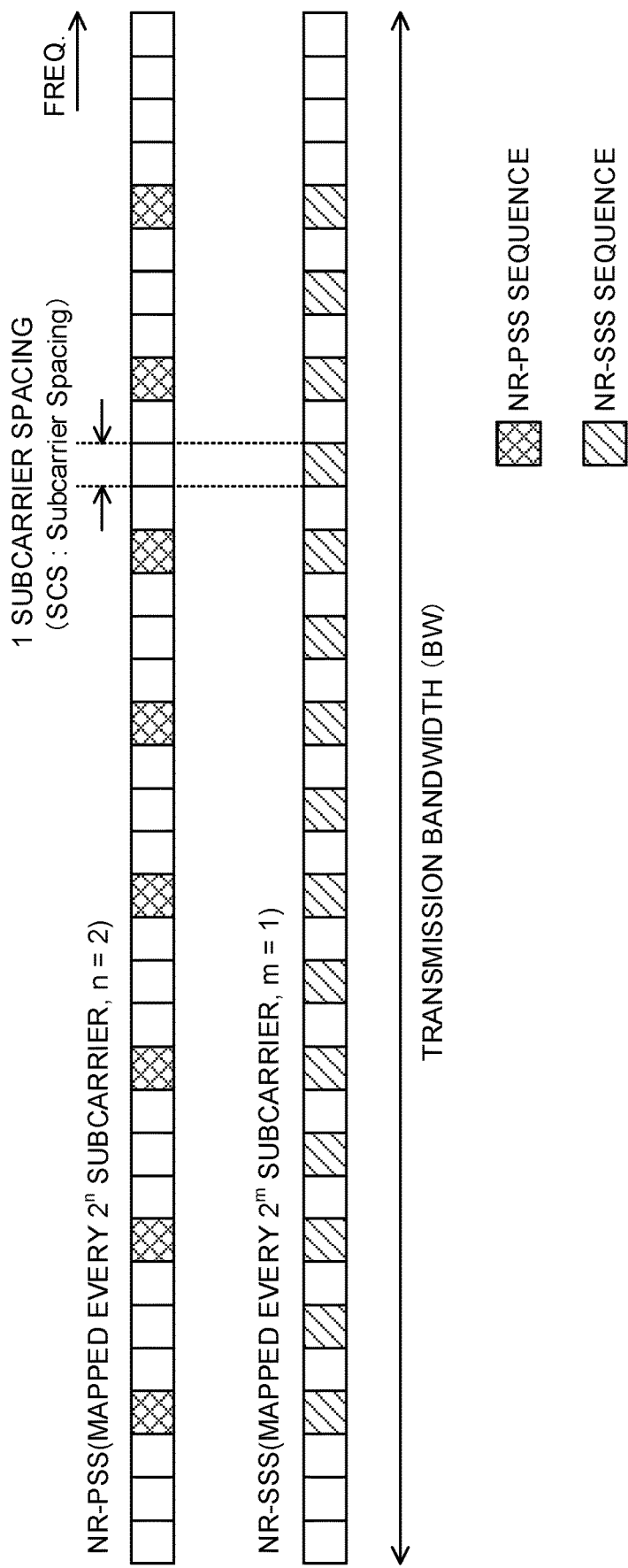
FIG. 3 is a diagram illustrating another example of the mapping method for mapping NR-PSSs and NR-SSSs on subcarriers.

The NR-SSS signal sequences may be mapped on subcarriers every $2^m$ subcarrier. In this regard, "m" is a value smaller than "n". FIG. 3 illustrates a mapping example where the NR-PSS signal sequences are mapped every $2^n$ subcarrier, and NR-SSS signal sequences are mapped on subcarriers every $2^m$ subcarrier. When the parameter m satisfies a condition of m<n, a mapping spacing of the NR-PSS signal sequences with respect to the subcarriers can be widened compared to a mapping spacing of the NR-SSS signal sequences with respect to the subcarriers.

The NR-SSS signal sequences are mapped every $2^m$ subcarrier, and therefore although the sequence lengths become short compared to a case where the NR-SSS signal sequences are contiguously mapped on subcarriers (the NR-PSSs in FIG. 2 (m=0)), a long sequence length compared to the NR-PSS signal sequences can be configured. As a result, it is possible to secure a necessary number of patterns for the NR-SSS signal sequences that are requested to have a larger number of patterns compared to the NR-PSSs.

For the parameter m, at least one value may be defined in advance by the specification per frequency band. SSS signal sequences of the legacy LTE systems may be reused for the NR-SSS signal sequences. Alternatively, the NR-SSS signal sequences may be extended or simplified SSS signal sequences. Furthermore, the NR-SSS signal sequences may be sequences generated by other methods. The number of patterns of the NR-SSS signal sequences may be determined based on a relationship with the number of patterns of the NR-PSS signal sequences as described above.

The user terminal receives each of the NR-PSSs and the NR-SSSs in each subframe in which the NR-PSSs and the NR-SSSs are transmitted during an initial access to an NR cell. A reception section detects the NR-PSSs in subframes in which the NR-PSSs are transmitted. The NR-PSSs are mapped on subcarriers of the predetermined transmission bandwidth BW every $2^n$ subcarrier based on the subcarrier spacing SP. The user terminal can detect the NR-PSS signal sequences based on the known subcarrier spacing SP and parameter n. By detecting the NR-PSSs, it is possible to detect a symbol boundary of the NR cell and correct a frequency offset.

The reception section detects the NR-SSSs in subframes in which the NR-SSSs are transmitted. The user terminal detects the NR-SSSs in a state where the symbol boundary of the NR cell is detected and the frequency offset is removed. The NR-SSSs are mapped on subcarriers of the same transmission bandwidth BW as that of the NR-PSSs every $2^m$ subcarrier based on the subcarrier spacing SP. The user terminal detects the NR-SSS signal sequences based on the subcarrier spacing SP and the parameter m. The NR-SSSs are arranged based on frequency/time domains associated with NR-PSS resource positions. After symbol synchronization is established by detection of the NR-PSSs of the high frequency offset tolerance, the user terminal can detect the NR-SSS in a state where the frequency offset is removed.

According to one aspect, the user terminal detects at least one of a PBCH and a reference signal based on the identical numerologies to those of the NR-PSSs and/or the NR-SSSs or scaled numerologies.

The user terminal detects the NR-PSSs and the NR-SSSs, and then receives the PBCH demodulation reference signal and the PBCH. The user terminal may control reception assuming the identical numerologies (the subcarrier spacing and a CP length) to those of the detected NR-PSSs/NR-SSSs for the PBCH and the PBCH demodulation reference signal.

The user terminal can perform reception and measurement processing on the PBCH and the PBCH demodulation reference signal by using the identical numerologies to those of the NR-PSSs/NR-SSSs. Consequently, it is possible to obtain the advantage that it is possible to perform processing by using the common sampling rate and the common number of FFT points during an initial access.

Furthermore, the user terminal may control reception assuming the numerologies obtained by performing $2^I$ scaling on the numerologies (the subcarrier spacing and the CP length) of the detected NR-PSSs/NR-SSSs for the PBCH and the PBCH demodulation reference signal. As a value of the parameter I, at least one value may be defined in advance by the specification per frequency band. For example, the frequency offset has been able to be sufficiently corrected by the NR-PSSs/NR-SSSs, so that it is possible to apply a narrower subcarrier spacing to the PBCH and the PBCH demodulation reference signal.

Furthermore, the user terminal may assume the identical numerologies (the subcarrier spacing and the CP length) to those of the detected NR-PSSs/NR-SSSs for a Mobility Reference Signal (Mobility RS) or may assume scaled numerologies for a mobility reference signal. The user terminal measures the mobility reference signal based on the identical numerologies (the subcarrier spacing and the CP length) to those of the detected NR-PSSs/NR-SSSs and/or the scaling parameter "I". By applying the identical numerologies or the scaling parameter "I" defined by the specification, it is possible to obtain an advantage that the user terminal can measure the mobility reference signal without reading numerology information from broadcast information when measuring other cells.

(Radio Communication System)

The configuration of the radio communication system according to one embodiment of the present invention will be described below. This radio communication system uses one or a combination of each of the above embodiment of the present invention to perform communication.

Figure 4:
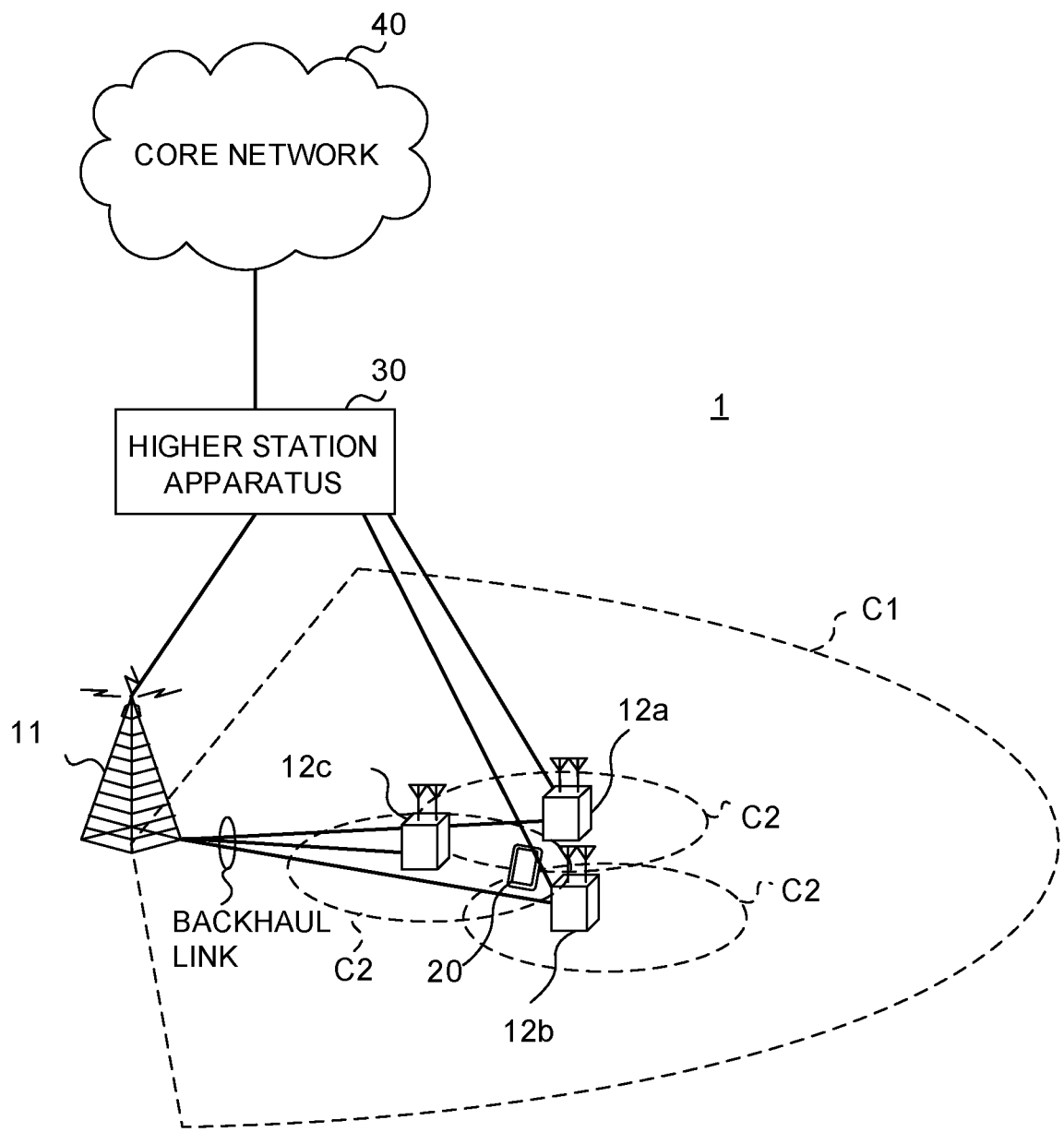
FIG. 4 is a diagram illustrating one example of a schematic configuration of a radio communication system according to one embodiment of the present invention.

FIG. 4 is a diagram illustrating one example of a schematic configuration of the radio communication system according to the one embodiment of the present invention. A radio communication system 1 can apply Carrier Aggregation (CA) and/or Dual Connectivity (DC) that aggregate a plurality of base frequency blocks (component carriers) whose one unit is a system bandwidth (e.g., 20 MHz) of the LTE system.

In this regard, the radio communication system 1 may be referred to as Long Term Evolution (LTE), LTE-Advanced (LTE-A), LTE-Beyond (LTE-B), SUPER 3G, IMT-Advanced, the 4th generation mobile communication system (4G), the 5th generation mobile communication system (5G), Future Radio Access (FRA) and the New Radio Access Technology (New-RAT), or a system that realizes these techniques.

The radio communication system 1 includes a radio base station 11 that forms a macro cell C1 of a relatively wide coverage, and radio base stations 12 (12a to 12c) that are located in the macro cell C1 and form small cells C2 narrower than the macro cell C1. Furthermore, a user terminal 20 is located in the macro cell C1 and each small cell C2.

The user terminal 20 can connect with both of the radio base station 11 and the radio base stations 12. The user terminal 20 is assumed to concurrently use the macro cell C1 and the small cells C2 by CA or DC. Furthermore, the user terminal 20 can apply CA or DC by using a plurality of cells (CCs) (e.g., five CCs or less or six CCs or more).

The user terminal 20 and the radio base station 11 can communicate by using a carrier (referred to as a Legacy carrier) of a narrow bandwidth in a relatively low frequency band (e.g., 2 GHz). On the other hand, the user terminal 20 and each radio base station 12 may use a carrier of a wide bandwidth in a relatively high frequency band (e.g., 3.5 GHz or 5 GHz) or may use the same carrier as that used between the user terminal 20 and the radio base station 11. In this regard, a configuration of the frequency band used by each radio base station is not limited to this.

The radio base station 11 and each radio base station 12 (or the two radio base stations 12) can be configured to be connected by way of wired connection (e.g., optical fibers compliant with a Common Public Radio Interface (CPRI) or an X2 interface) or by way of radio connection.

The radio base station 11 and each radio base station 12 are each connected with a higher station apparatus 30 and connected with a core network 40 via the higher station apparatus 30. In this regard, the higher station apparatus 30 includes, for example, an access gateway apparatus, a Radio Network Controller (RNC) and a Mobility Management Entity (MME), yet is not limited to these. Furthermore, each radio base station 12 may be connected with the higher station apparatus 30 via the radio base station 11.

In this regard, the radio base station 11 is a radio base station that has a relatively wide coverage, and may be referred to as a macro base station, an aggregate node, an eNodeB (eNB) or a transmission reception point. Furthermore, each radio base station 12 is a radio base station that has a local coverage, and may be referred to as a small base station, a micro base station, a pico base station, a femto base station, a Home eNodeB (HeNB), a Remote Radio Head (RRH) or a transmission reception point. The radio base stations 11 and 12 will be collectively referred to as a radio base station 10 below when not distinguished.

Each user terminal 20 is a terminal that supports various communication schemes such as LTE and LTE-A, and may include not only a mobile communication terminal (mobile station) but also a fixed communication terminal (fixed station).

The radio communication system 1 applies Orthogonal Frequency-Division Multiple Access (OFDMA) to downlink and Single Carrier Frequency Division Multiple Access (SC-FDMA) to uplink as radio access schemes.

OFDMA is a multicarrier transmission scheme that divides a frequency band into a plurality of narrow frequency bands (subcarriers) and maps data on each subcarrier to perform communication. SC-FDMA is a single carrier transmission scheme that divides a system bandwidth into a band including one or contiguous resource blocks per terminal and causes a plurality of terminals to use respectively different bands to reduce an inter-terminal interference. In this regard, uplink and downlink radio access schemes are not limited to a combination of these, and other radio access schemes may be used for the uplink and downlink radio access schemes.

The radio communication system 1 uses a downlink shared channel (PDSCH: Physical Downlink Shared Channel) shared by each user terminal 20, a broadcast channel (PBCH: Physical Broadcast Channel) and a downlink L1/L2 control channel as downlink channels. User data, higher layer control information and System Information Blocks (SIBs) are transmitted on the PDSCH. Furthermore, Master Information Blocks (MIBs) are transmitted on the PBCH. A common control channel for notifying whether or not there is a paging channel is mapped on a downlink L1/L2 control channel (e.g., PDCCH), and data of the paging channel (PCH) is mapped on the PDSCH. A downlink reference signal, an uplink reference signal and a physical downlink synchronization signal are additionally arranged.

The downlink L1/L2 control channel includes a Physical Downlink Control Channel (PDCCH), an Enhanced Physical Downlink Control Channel (EPDCCH), a Physical Control Format Indicator Channel (PCFICH), and a Physical Hybrid-ARQ Indicator Channel (PHICH). Downlink Control Information (DCI) including scheduling information of the PDSCH and the PUSCH is transmitted on the PDCCH. The number of OFDM symbols used for the PDCCH is transmitted on the PCFICH. Transmission acknowledgement information (also referred to as, for example, retransmission control information, HARQ-ACK or ACK/NACK) of a Hybrid Automatic Repeat reQuest (HARQ) for the PUSCH is transmitted on the PHICH. The EPDCCH is subjected to frequency division multiplexing with the PDSCH (downlink shared data channel) and is used to transmit DCI similar to the PDCCH.

The radio communication system 1 uses an uplink shared channel (PUSCH: Physical Uplink Shared Channel) shared by each user terminal 20, an uplink control channel (PUCCH: Physical Uplink Control Channel), and a random access channel (PRACH: Physical Random Access Channel) as uplink channels. User data and higher layer control information are transmitted on the PUSCH. Furthermore, downlink radio quality information (CQI: Channel Quality Indicator) and transmission acknowledgement information are transmitted on the PUCCH. A random access preamble for establishing connection with cells is transmitted on the PRACH.

The radio communication system 1 transmits a Cell-specific Reference Signal (CRS), a Channel State Information-Reference Signal (CSI-RS), a DeModulation Reference Signal (DMRS) and a Positioning Reference Signal (PRS) as downlink reference signals. Furthermore, the radio communication system 1 transmits a Sounding Reference Signal (SRS) and a DeModulation Reference Signal (DMRS) as uplink reference signals. In this regard, the DMRS may be referred to as a user terminal specific reference signal (UE-specific Reference Signal). Furthermore, a reference signal to be transmitted is not limited to these.

(Radio Base Station)

Figure 5:
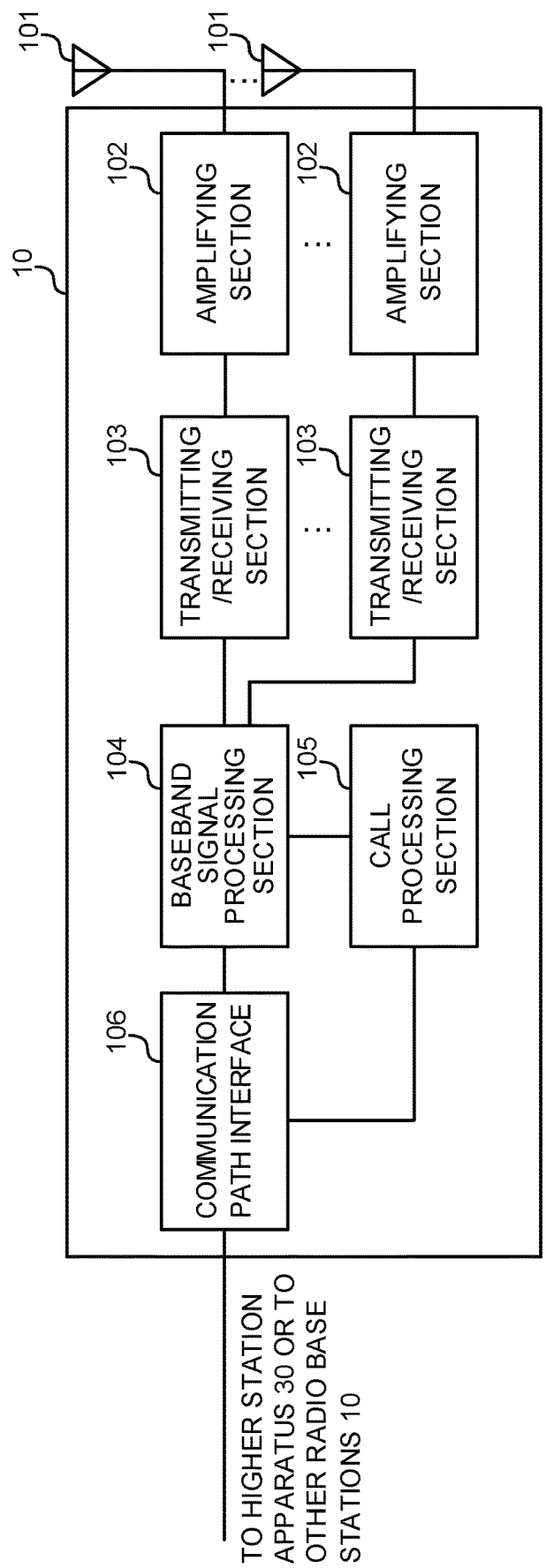
FIG. 5 is a diagram illustrating one example of an overall configuration of a radio base station according to the one embodiment of the present invention.

FIG. 5 is a diagram illustrating one example of an overall configuration of the radio base station according to the one embodiment of the present invention. The radio base station 10 includes pluralities of transmission/reception antennas 101, amplifying sections 102 and transmission/reception sections 103, a baseband signal processing section 104, a call processing section 105 and a channel interface 106. In this regard, the radio base station 10 only needs to be configured to include one or more of each of the transmission/reception antennas 101, the amplifying sections 102 and the transmission/reception sections 103.

User data transmitted from the radio base station 10 to the user terminal 20 on downlink is input from the higher station apparatus 30 to the baseband signal processing section 104 via the channel interface 106.

The baseband signal processing section 104 performs processing of a Packet Data Convergence Protocol (PDCP) layer, segmentation and concatenation of the user data, transmission processing of an RLC layer such as Radio Link Control (RLC) retransmission control, Medium Access Control (MAC) retransmission control (such as HARQ transmission processing), and transmission processing such as scheduling, transmission format selection, channel coding, Inverse Fast Fourier Transform (IFFT) processing, and precoding processing on the user data, and transfers the user data to each transmission/reception section 103. Furthermore, the baseband signal processing section 104 performs transmission processing such as channel coding and inverse fast Fourier transform on a downlink control signal, too, and transfers the downlink control signal to each transmission/reception section 103.

Each transmission/reception section 103 converts a baseband signal precoded and output per antenna from the baseband signal processing section 104 into a radio frequency band, and transmits a radio frequency signal. The radio frequency signal subjected to frequency conversion by each transmission/reception section 103 is amplified by each amplifying section 102, and is transmitted from each transmission/reception antenna 101. The transmission/reception sections 103 can be composed of transmitters/receivers, transmission/reception circuits or transmission/reception apparatuses described based on a common knowledge in a technical field according to the present invention. In this regard, the transmission/reception sections 103 may be composed as an integrated transmission/reception section or may be composed of transmission sections and reception sections.

Meanwhile, each amplifying section 102 amplifies a radio frequency signal as an uplink signal received by each transmission/reception antenna 101. Each transmission/reception section 103 receives the uplink signal amplified by each amplifying section 102. Each transmission/reception section 103 performs frequency conversion on the received signal into a baseband signal, and outputs the baseband signal to the baseband signal processing section 104.

The baseband signal processing section 104 performs Fast Fourier Transform (FFT) processing, Inverse Discrete Fourier Transform (IDFT) processing, error correcting decoding, reception processing of MAC retransmission control, and reception processing of an RLC layer and a PDCP layer on user data included in the input uplink signal, and transfers the user data to the higher station apparatus 30 via the channel interface 106. The call processing section 105 performs call processing such as a configuration and release of a communication channel, state management of the radio base station 10, and radio resource management.

The channel interface 106 transmits and receives signals to and from the higher station apparatus 30 via a predetermined interface. Furthermore, the channel interface 106 may transmit and receive (backhaul signaling) signals to and from the another radio base station 10 via an inter-base station interface (e.g., optical fibers compliant with the Common Public Radio Interface (CPRI) or the X2 interface).

Each transmission/reception section 103 transmits a synchronization signal, a broadcast channel and system information (SIB). According to 3GPP, the synchronization signals include at least two synchronization signals (NR-PSSs and NR-SSSs) whose introduction to 5G/NR has been agreed. Each transmission/reception section 103 transmits the NR-PSSs that are the first synchronization signals used to detect a symbol boundary of an NR cell during an initial access to the NR cell, and the NR-SSSs that are the second synchronization signals used to detect NR cell IDs or part of NR cell IDs.

Predetermined subframes in which the NR-PSSs and the NR-SSSs are transmitted may be defined by standards. NR-PSS signal sequences are mapped on subcarriers of the transmission bandwidth BW every $2^n$ subcarrier in subframes in which the NR-PSSs are transmitted (see FIG. 2). Furthermore, the NR-SSS signal sequences are mapped on subcarriers every $2^m$ subcarrier in the subframes in which the NR-SSSs are transmitted (see FIG. 3). In this regard, a relationship of m<n is organized for the parameters n and m. When the NR-SSS signal sequences are contiguously mapped on subcarriers (see FIG. 2), the parameter m=0 holds.

Furthermore, each transmission/reception section 103 applies the identical numerologies (the subcarrier spacing and the CP length) to those of the NR-PSSs/NR-SSSs and scaled numerologies to at least one a PBCH, a PBCH demodulation reference signal and a mobility reference signal.

Figure 6:
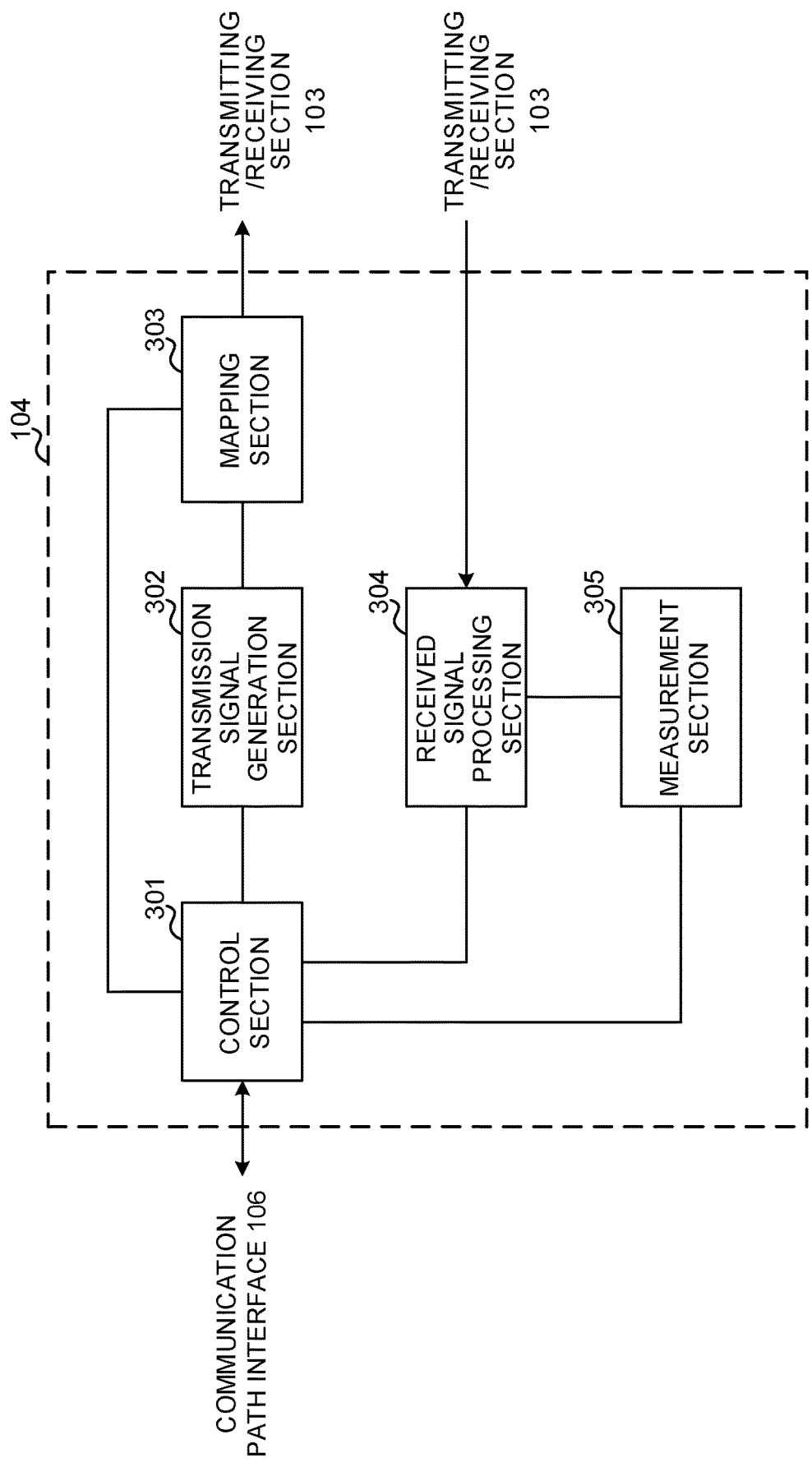
FIG. 6 is a diagram illustrating one example of a function configuration of the radio base station according to the one embodiment of the present invention.

FIG. 6 is a diagram illustrating one example of a function configuration of the radio base station according to the one embodiment of the present invention. In addition, this example mainly illustrates function blocks of characteristic portions according to the present embodiment, and assumes that the radio base station 10 includes other function blocks, too, that are necessary for radio communication.

The baseband signal processing section 104 includes at least a control section (scheduler) 301, a transmission signal generating section 302, a mapping section 303, a received signal processing section 304 and a measurement section 305. In addition, these components only need to be included in the radio base station 10, and part or all of the components may not be included in the baseband signal processing section 104. The baseband signal processing section 104 includes a digital beam forming function that provides digital beam forming.

The control section (scheduler) 301 controls the entire radio base station 10. The control section 301 can be composed of a controller, a control circuit or a control apparatus described based on the common knowledge in the technical field according to the present invention.

The control section 301 controls, for example, signal (including synchronization signals, MIBs, a paging channel and a signal corresponding to a broadcast channel) generation of the transmission signal generating section 302 and signal allocation of the mapping section 303. The control section 301 controls mapping of the two synchronization signals (the NR-PSSs and the NR-SSSs), the PBCH, the PBCH demodulation reference signal and the mobility reference signal on subcarriers described in the above embodiment. Furthermore, the control section 301 controls signal reception processing of the received signal processing section 304 and signal measurement of the measurement section 305.

The control section 301 controls scheduling of system information (an SIB or an MIB), a downlink data signal (including a PCH of a paging message) transmitted on the PDSCH, and a downlink control signal transmitted on the PDCCH and/or the EPDCCH (e.g., resource allocation, a shared control channel for notifying whether or not there is a paging message or a signal for notifying multi-beam approach or single beam approach).

The control section 301 schedules transmission of the synchronization signals (e.g., NR-PSSs/NR-SSSs), and/or the MIB and the broadcast channel in predetermined subframes, and controls resource mapping such that at least the NR-PSSs/NR-SSSs are mapped at the subcarrier mapping spacing according to the above embodiment.

Furthermore, the control section 301 performs control such that the NR-PSSs and the NR-SSSs are mapped at the identical transmission bandwidth BW and the identical subcarrier spacing SP. The control section 301 schedules transmission of downlink reference signals of the PBCH demodulation reference signal and the Mobility Reference Signal (Mobility RS) in predetermined subframes, and controls at least one of the subcarrier spacing and the CP length by the identical numerologies to those of the NR-PSSs/NR-SSSs or the scaled numerologies.

Furthermore, the control section 301 applies FDM to the PBCH and the PBCH demodulation reference signal, and controls a resource arrangement such that the PBCH demodulation reference signal is mapped on the identical time resource to that of the PBCH. In addition, the control section 301 may perform resource control such that the PBCH has a bandwidth different from a total bandwidth in a case where FDM is performed on the NR-PSSs and the NR-SSSs. Furthermore, different transmission bandwidths (sequence lengths) may be applied to the NR-PSSs and the NR-SSSs.

The transmission signal generating section 302 generates a downlink signal (such as a downlink control signal, a downlink data signal or a downlink reference signal) based on an instruction from the control section 301, and outputs the downlink signal to the mapping section 303. The transmission signal generating section 302 can be composed of a signal generator, a signal generating circuit or a signal generating apparatus described based on the common knowledge in the technical field according to the present invention.

The transmission signal generating section 302 generates, for example, a DL assignment for notifying downlink signal allocation information, and a UL grant for notifying uplink signal allocation information based on the instruction from the control section 301. Furthermore, the transmission signal generating section 302 performs encoding processing and modulation processing on a downlink data signal according to a code rate and a modulation scheme determined based on Channel State Information (CSI) from each user terminal 20. Furthermore, the transmission signal generating section 302 generates a signal for notifying multi-beam approach or single beam approach in a common control channel including the MIB or system information corresponding to the MIB based on an instruction from the control section 301.

The mapping section 303 maps the downlink signal generated by the transmission signal generating section 302, on a predetermined radio resource based on the instruction from the control section 301, and outputs the downlink signal to each transmission/reception section 103. The mapping section 303 can be composed of a mapper, a mapping circuit or a mapping apparatus described based on the common knowledge in the technical field according to the present invention.

For example, the mapping section 303 maps NR-PSS signal sequences on subcarriers of the transmission bandwidth BW every $2^n$ subcarrier in subframes in which the NR-PSSs are transmitted based on the instruction from the control section 301 (see FIG. 3). Furthermore, the mapping section 303 maps the NR-SSS signal sequences on subcarriers every $2^m$ subcarrier in subframes in which the NR-SSSs are transmitted (see FIG. 3). In this regard, m<n holds.

The received signal processing section 304 performs reception processing (e.g., demapping, demodulation and decoding) on a received signal input from each transmission/reception section 103. In this regard, the received signal is, for example, an uplink signal (such as an uplink control signal, an uplink data signal and an uplink reference signal) transmitted from the user terminal 20. The received signal processing section 304 can be composed of a signal processor, a signal processing circuit or a signal processing apparatus described based on the common knowledge in the technical field according to the present invention.

The received signal processing section 304 outputs information decoded by the reception processing to the control section 301. When, for example, receiving the PUCCH including HARQ-ACK, the received signal processing section 304 outputs the HARQ-ACK to the control section 301. Furthermore, the received signal processing section 304 outputs the received signal and the signal after the reception processing to the measurement section 305.

The measurement section 305 performs measurement related to the received signal. The measurement section 305 can be composed of a measurement instrument, a measurement circuit or a measurement apparatus described based on the common knowledge in the technical field according to the present invention.

The measurement section 305 may measure, for example, received power (e.g., Reference Signal Received Power (RSRP)), received quality (e.g., Reference Signal Received Quality (RSRQ) or a Signal to Interference plus Noise Ratio (SINR)) or a channel state of the received signal. The measurement section 305 may output a measurement result to the control section 301.

(User Terminal)

Figure 7:
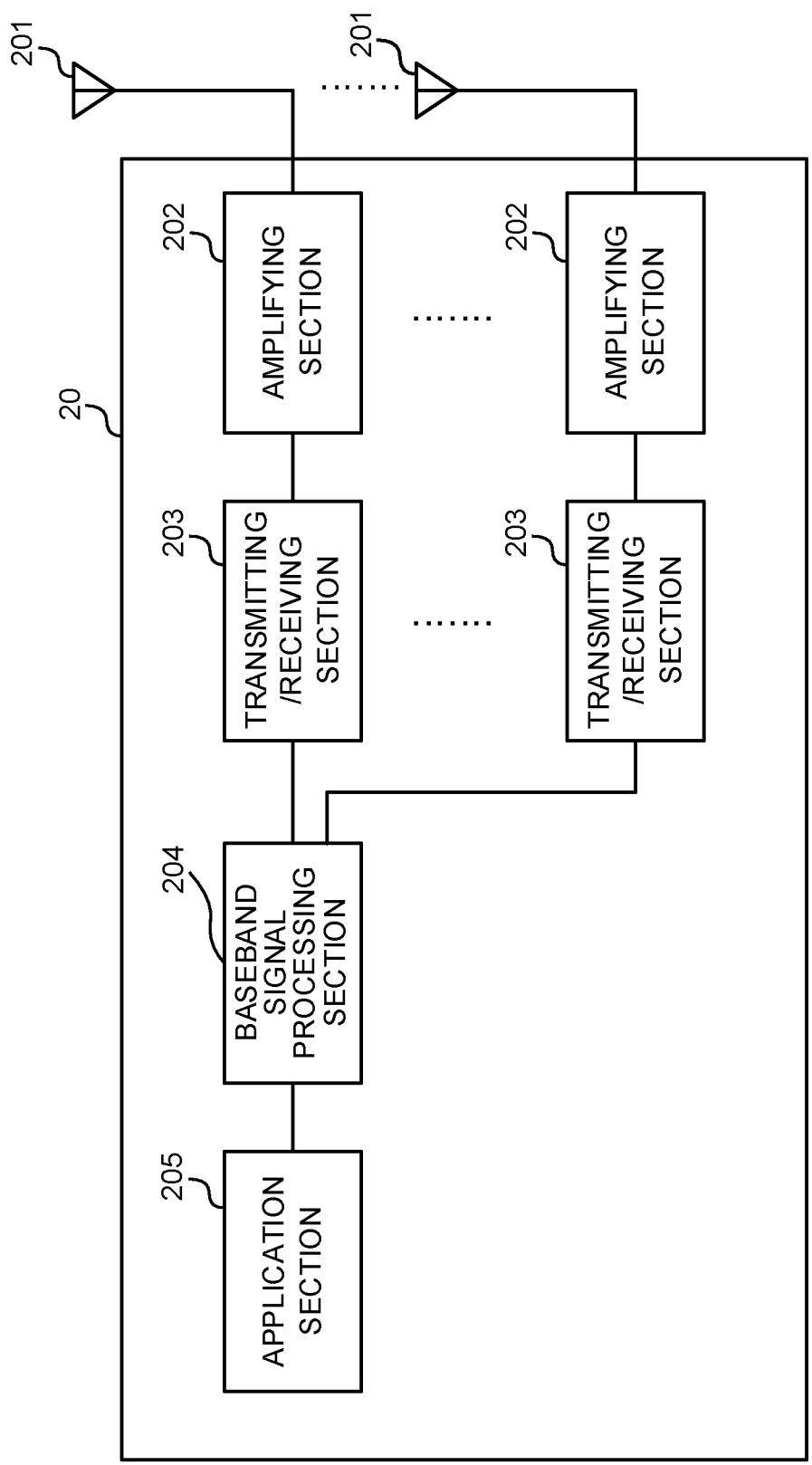
FIG. 7 is a diagram illustrating one example of an overall configuration of a user terminal according to the one embodiment of the present invention.

FIG. 7 is a diagram illustrating one example of an overall configuration of the user terminal according to the one embodiment of the present invention. The user terminal 20 includes pluralities of transmission/reception antennas 201, amplifying sections 202 and transmission/reception sections 203, a baseband signal processing section 204 and an application section 205. In this regard, the user terminal 20 only needs to be configured to include one or more of each of the transmission/reception antennas 201, the amplifying sections 202 and the transmission/reception sections 203.

Each amplifying section 202 amplifies a radio frequency signal received at each transmission/reception antenna 201. Each transmission/reception section 203 receives a downlink signal amplified by each amplifying section 202. Each transmission/reception section 203 performs frequency conversion on the received signal into a baseband signal, and outputs the baseband signal to the baseband signal processing section 204. The transmission/reception sections 203 can be composed of transmitters/receivers, transmission/reception circuits or transmission/reception apparatuses described based on the common knowledge in the technical field according to the present invention. In this regard, the transmission/reception sections 203 may be composed as an integrated transmission/reception section or may be composed of transmission sections and reception sections.

The baseband signal processing section 204 performs FFT processing, error correcting decoding, and reception processing of retransmission control on the input baseband signal. The baseband signal processing section 204 transfers downlink user data to the application section 205. The application section 205 performs processing related to layers higher than a physical layer and an MAC layer. Furthermore, the baseband signal processing section 204 may transfer broadcast information, too, among the downlink data to the application section 205.

On the other hand, the application section 205 inputs uplink user data to the baseband signal processing section 204. The baseband signal processing section 204 performs transmission processing of retransmission control (e.g., HARQ transmission processing), channel coding, precoding, Discrete Fourier Transform (DFT) processing and IFFT processing on the uplink user data, and transfers the uplink user data to each transmission/reception section 203. Each transmission/reception section 203 converts the baseband signal output from the baseband signal processing section 204 into a radio frequency band, and transmits a radio frequency signal. The radio frequency signal subjected to the frequency conversion by each transmission/reception section 203 is amplified by each amplifying section 202, and is transmitted from each transmission/reception antenna 201.

In addition, each transmission/reception section 203 may further include an analog beam forming section that performs analog beam forming. The analog beam forming section can be composed of an analog beam forming circuit (e.g., a phase shifter or a phase shift circuit) or an analog beam forming apparatus (e.g., a phase shifter) described based on the common knowledge in the technical field according to the present invention. Furthermore, each transmission/reception antenna 201 can be composed of an array antenna, for example.

Each transmission/reception section 203 receives synchronization signals, a broadcast channel and system information (SIB). Each transmission/reception section 203 receives at least two synchronization signals (the NR-PSSs and the NR-SSSs) whose introduction to 5G/NR has been agreed. Furthermore, each transmission/reception section 203 receives a PBCH, a PBCH demodulation reference signal and a mobility reference signal.

Figure 8:
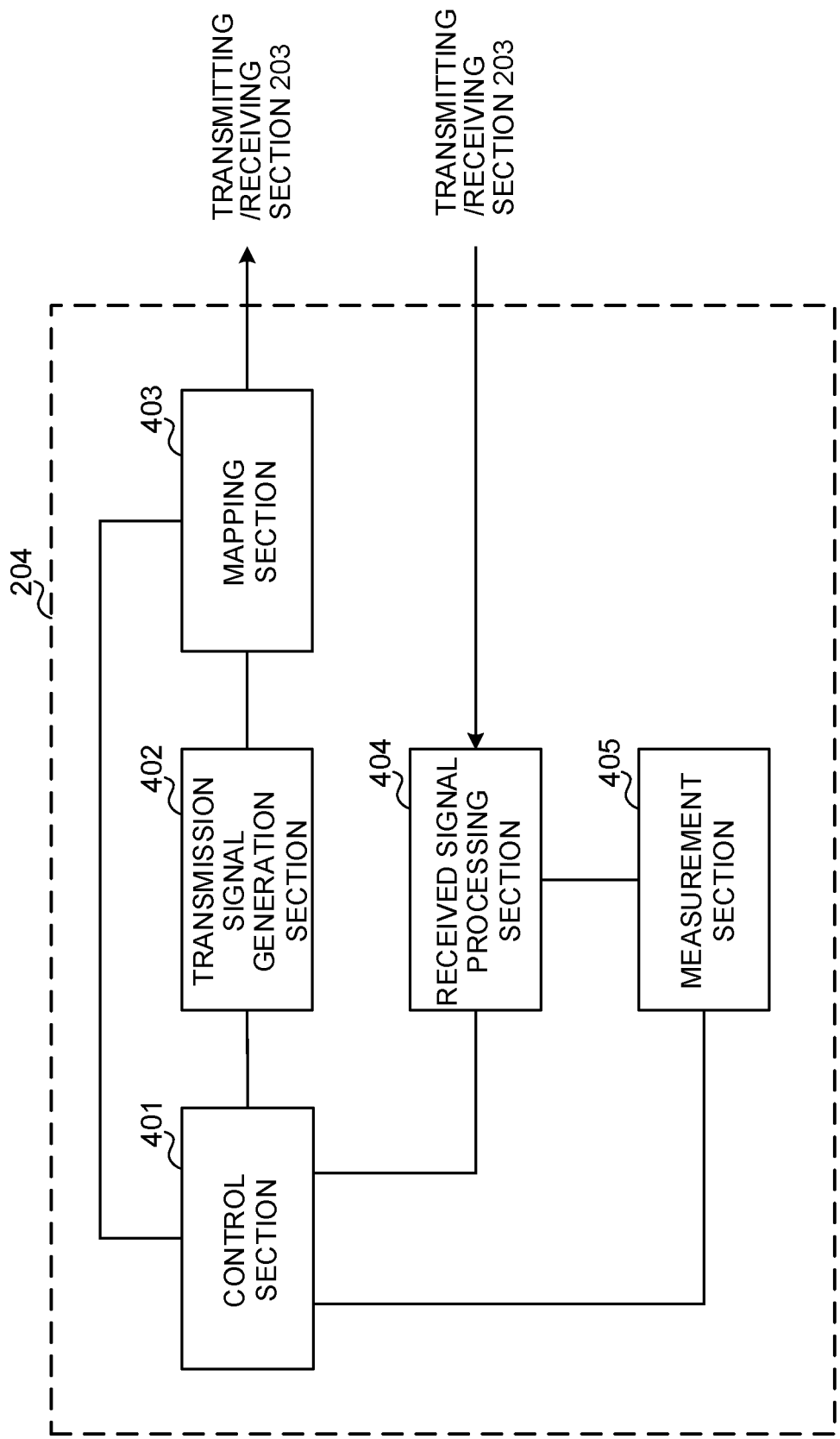
FIG. 8 is a diagram illustrating one example of a function configuration of the user terminal according to the one embodiment of the present invention.

FIG. 8 is a diagram illustrating one example of a function configuration of the user terminal according to the one embodiment of the present invention. In addition, this example mainly illustrates function blocks of characteristic portions according to the present embodiment, and assumes that the user terminal 20 includes other function blocks, too, that are necessary for radio communication.

The baseband signal processing section 204 of the user terminal 20 includes at least a control section 401, a transmission signal generating section 402, a mapping section 403, a received signal processing section 404 and a measurement section 405. In addition, these components only need to be included in the user terminal 20, and part or all of the components may be included in the baseband signal processing section 204.

The control section 401 controls the entire user terminal 20. The control section 401 can be composed of a controller, a control circuit or a control apparatus described based on the common knowledge in the technical field according to the present invention.

The control section 401 controls, for example, signal generation of the transmission signal generating section 402 and signal allocation of the mapping section 403. Furthermore, the control section 401 controls signal reception processing and synchronization signal of the received signal processing section 404 and signal measurement of the measurement section 405.

The control section 401 obtains, from the received signal processing section 404, downlink control signals (signals transmitted on the PDCCH/EPDCCH) and a downlink data signal (a signal transmitted on the PDSCH) transmitted from the radio base station 10. The control section 401 controls generation of an uplink control signal (e.g., transmission acknowledgement information) and an uplink data signal based on a result obtained by deciding whether or not it is necessary to perform retransmission control on the downlink control signal and the downlink data signal.

The control section 401 controls formation of a transmission beam and/or a reception beam by using digital BF (e.g., precoding) of the baseband signal processing section 204 and/or analog BF (e.g., phase rotation) of each transmission/reception section 203.

For example, the control section 401 receives at least one beam directed to the own user terminal among a plurality of beams transmitted in a predetermined period (e.g., sweep period).

Furthermore, the control section 401 controls reception processing assuming that NR-PSS signal sequences are mapped on the subcarriers of the transmission bandwidth BW every $2^n$ subcarrier in subframes in which the NR-PSSs are transmitted, and controls reception processing assuming that the NR-SSS signal sequences are mapped on the subcarriers of the transmission bandwidth BW every $2^m$ subcarrier in subframes in which the NR-SSSs are transmitted (see FIG. 3). Parameters (the subcarrier spacing SP of a use frequency band, and parameters n and m where m<n holds) of a subcarrier mapping spacing of the NR-PSSs and the NR-SSSs may be known parameters defined by the standards.

The control section 401 controls synchronization processing based on the NR-PSSs and the NR-SSSs. The control section 401 performs synchronization processing (symbol synchronization) of detecting the NR-PSSs and detecting a symbol boundary and corrects a frequency offset, and then detects the NR-SSSs, and detects the NR cell IDs or part of the NR cell IDs. Furthermore, the control section 401 further corrects the frequency offset.

Furthermore, the control section 401 performs control to perform reception processing assuming that the PBCH and/ or the PBCH demodulation reference signal are applied the same numerologies as those of the NR-PSSs/NR-SSSs or the scaled numerologies. For example, the control section 401 controls reception assuming that the same subcarrier spacing as the subcarrier spacing SP of the NR-PSSs and/or the NR-SSSs is applied to the PBCH and/or the PBCH demodulation reference signal. Alternatively, the control section 401 controls reception assuming that the subcarrier spacing obtained by performing $2^I$ scaling on the subcarrier spacing SP of the NR-PSSs and/or the NR-SSSs is applied to the PBCH and/or the PBCH demodulation reference signal.

Furthermore, the control section 401 controls a reception operation to monitor resources determined according to a detection result of synchronization signals and/or a broadcast channel received from the radio base station before transmission of a random access preamble, and receive a paging channel.

The transmission signal generating section 402 generates an uplink signal (such as an uplink control signal, an uplink data signal and an uplink reference signal) based on an instruction from the control section 401, and outputs the uplink signal to the mapping section 403. The transmission signal generating section 402 can be composed of a signal generator, a signal generating circuit or a signal generating apparatus described based on the common knowledge in the technical field according to the present invention.

The transmission signal generating section 402 generates an uplink control signal related to transmission acknowledgement information and Channel State Information (CSI) based on, for example, the instruction from the control section 401. Furthermore, the transmission signal generating section 402 generates an uplink data signal based on the instruction from the control section 401. When, for example, the downlink control signal notified from the radio base station 10 includes a UL grant, the transmission signal generating section 402 is instructed by the control section 401 to generate an uplink data signal.

The mapping section 403 maps the uplink signal generated by the transmission signal generating section 402, on a radio resource based on the instruction from the control section 401, and outputs the uplink signal to each transmission/reception section 203. The mapping section 403 can be composed of a mapper, a mapping circuit or a mapping apparatus described based on the common knowledge in the technical field according to the present invention.

The received signal processing section 404 performs reception processing (e.g., demapping, demodulation and decoding) on the received signal input from each transmission/reception section 203. In this regard, the received signal is, for example, a downlink signal (synchronization signals (NR-PSS/NR-SSS), a PBCH, a PBCH demodulation reference signal, a mobility reference signal, a downlink control signal or a downlink data signal) transmitted from the radio base station 10. The received signal processing section 404 can be composed of a signal processor, a signal processing circuit or a signal processing apparatus described based on the common knowledge in the technical field according to the present invention. Furthermore, the received signal processing section 404 can compose the reception section according to the present invention.

The received signal processing section 404 receives the synchronization signals (NR-PSSs/NR-SSSs) and the broadcast channel transmitted from the radio base station based on an instruction from the control section 401. The received signal processing section 404 receives the synchronization signals (NR-PSSs/NR-SSSs) and the broadcast channel allocated to at least one of a plurality of time domains (e.g., symbols) that compose a predetermined transmission time interval (e.g., a subframe or a slot).

For example, the received signal processing section 404 receives each of the NR-PSSs and the NR-SSSs based on the instruction from the control section 401 during an initial access to an NR cell. The received signal processing section 404 performs reception assuming that the NR-PSSs are mapped on the subcarriers of the predetermined transmission bandwidth BW every $2^n$ subcarrier based on the subcarrier spacing SP in the subframes in which the NR-PSSs are transmitted. By detecting the NR-PSS signal sequences based on the known subcarrier spacing SP and parameter n, the received signal processing section 404 can detect the symbol boundary of the NR cell.

Furthermore, the received signal processing section 404 detects the NR-SSSs in the subframes in which the NR-SSSs are transmitted. The received signal processing section 404 detects the NR-SSSs arranged at known resource positions from the detected NR-PSSs assuming that the NR-SSSs are mapped on the subcarriers every $2^m$ subcarrier based on the subcarrier spacing SP. The NR-SSSs are arranged based on frequency/time domains associated with NR-PSS resource positions. After symbol synchronization is established by detection of the NR-PSSs of the high frequency offset tolerance, the received signal processing section 404 detects the NR-SSSs.

Furthermore, the received signal processing section 404 receives the PBCH and/or the PBCH demodulation reference signal based on the instruction from the control section 401. In this case, the received signal processing section 404 performs reception processing assuming that the PBCH and/or the PBCH demodulation reference signal are applied the same numerologies as those of the NR-PSSs/NR-SSSs or the scaled numerologies.

Furthermore, the received signal processing section 404 may receive a paging message (PCH) and a common control channel for scheduling the paging message on different symbols or on different subframes based on the instruction from the control section 401.

The received signal processing section 404 outputs information decoded by the reception processing to the control section 401. The received signal processing section 404 outputs, for example, broadcast information, system information, RRC signaling and DCI to the control section 401. Furthermore, the received signal processing section 404 outputs the received signal and the signal after the reception processing to the measurement section 405.

The measurement section 405 performs measurement related to the received signal. For example, the measurement section 405 performs measurement by using a beam formation RS transmitted from the radio base station 10. The measurement section 405 can be composed of a measurement instrument, a measurement circuit or a measurement apparatus described based on the common knowledge in the technical field according to the present invention.

The measurement section 405 may measure, for example, received power (e.g., RSRP), received quality (e.g., RSRQ or a received SINR) or a channel state of the received signal. The measurement section 405 may output a measurement result to the control section 401.

(Hardware Configuration)

In addition, the block diagrams used to describe the above embodiment illustrate blocks in function units. These function blocks (components) are realized by an optional combination of hardware and/or software. Furthermore, means for realizing each function block is not limited in particular. That is, each function block may be realized by one physically and/or logically coupled apparatus or may be realized by a plurality of these apparatuses formed by connecting two or more physically and/or logically separate apparatuses directly and/or indirectly (by way of, for example, wired connection and/or radio connection).

Figure 9:
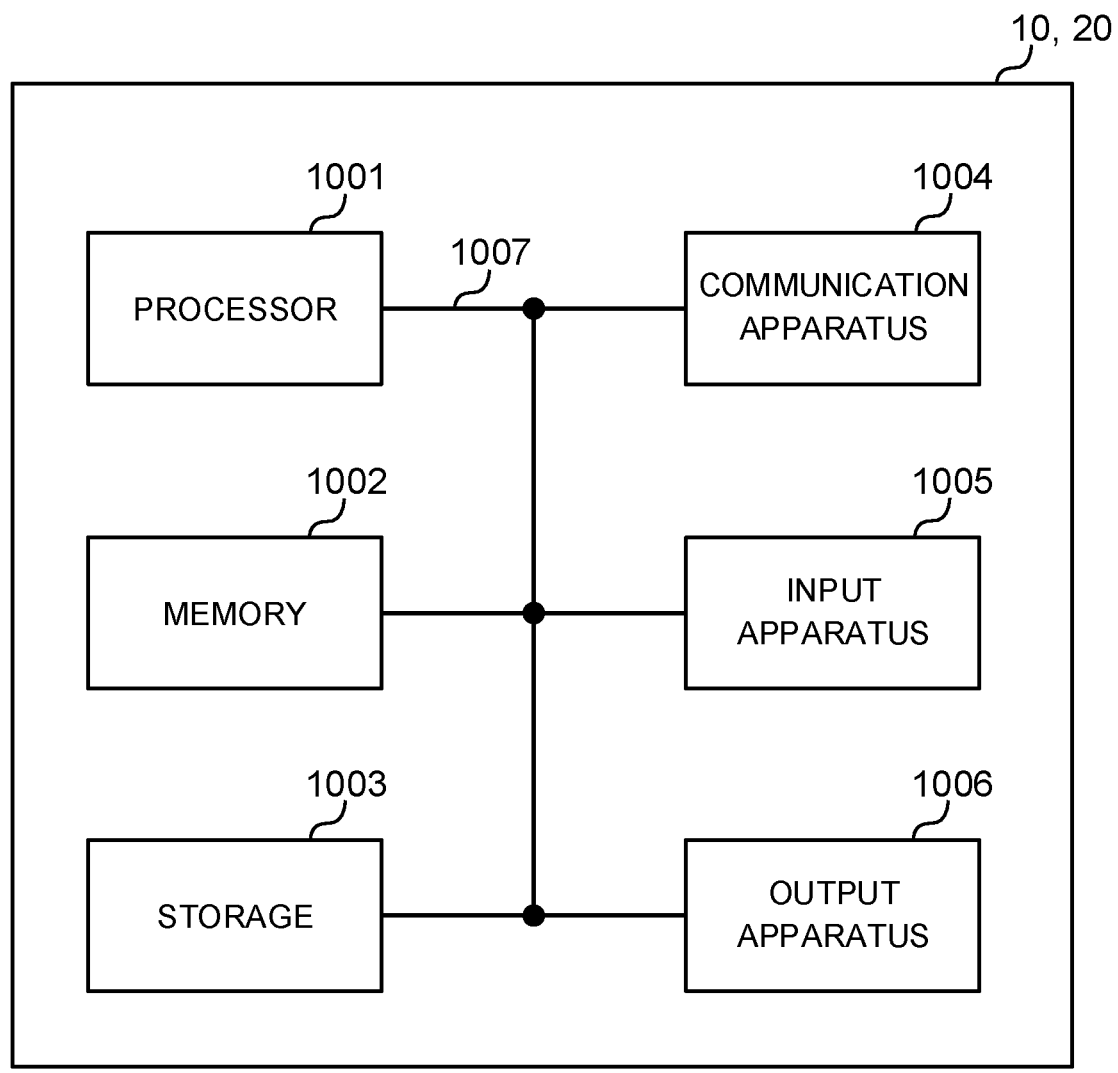
FIG. 9 is a diagram illustrating one example of hardware configurations of the radio base station and the user terminal according to the one embodiment of the present invention.

For example, the radio base station and the user terminal according to the one embodiment of the present invention may function as computers that perform processing of the radio communication method according to the present invention. FIG. 9 is a diagram illustrating one example of the hardware configurations of the radio base station and the user terminal according to the one embodiment of the present invention. The above radio base station 10 and user terminal 20 may be each physically configured as a computer apparatus that includes a processor 1001, a memory 1002, a storage 1003, a communication apparatus 1004, an input apparatus 1005, an output apparatus 1006 and a bus 1007.

In this regard, a word "apparatus" in the following description can be read as a circuit, a device or a unit. The hardware configurations of the radio base station 10 and the user terminal 20 may be configured to include one or a plurality of apparatuses illustrated in FIG. 9 or may be configured without including part of the apparatuses.

For example, FIG. 9 illustrates the only one processor 1001. However, there may be a plurality of processors. Furthermore, processing may be executed by one processor or may be executed by one or more processors concurrently, successively or by another method. In addition, the processor 1001 may be implemented by one or more chips.

Each function of the radio base station 10 and the user terminal 20 is realized by, for example, causing hardware such as the processor 1001 and the memory 1002 to read predetermined software (program), and thereby causing the processor 1001 to perform an operation, and control communication of the communication apparatus 1004 and reading and/or writing of data in the memory 1002 and the storage 1003.

The processor 1001 causes, for example, an operating system to operate to control the entire computer. The processor 1001 may be composed of a Central Processing Unit (CPU) including an interface for a peripheral apparatus, a control apparatus, an operation apparatus and a register. For example, the above baseband signal processing section 104 (204) and call processing section 105 may be realized by the processor 1001.

Furthermore, the processor 1001 reads programs (program codes), a software module or data from the storage 1003 and/or the communication apparatus 1004 out to the memory 1002, and executes various types of processing according to these programs, software module or data. As the programs, programs that cause the computer to execute at least part of the operations described in the above embodiment are used. For example, the control section 401 of the user terminal 20 may be realized by a control program stored in the memory 1002 and operating on the processor 1001, and other function blocks may be also realized likewise.

The memory 1002 is a computer-readable recording medium, and may be composed of at least one of, for example, a Read Only Memory (ROM), an Erasable Programmable ROM (EPROM), an Electrically EPROM (EEPROM), a Random Access Memory (RAM) and other appropriate storage media. The memory 1002 may be referred to as a register, a cache or a main memory (main storage apparatus). The memory 1002 can store programs (program codes) and a software module that can be executed to carry out the radio communication method according to the one embodiment of the present invention.

The storage 1003 is a computer-readable recording medium and may be composed of at least one of, for example, a flexible disk, a floppy (registered trademark) disk, a magnetooptical disk (e.g., a compact disk (Compact Disc ROM (CD-ROM)), a digital versatile disk and a Blu-ray (registered trademark) disk), a removable disk, a hard disk drive, a smart card, a flash memory device (e.g., a card, a stick or a key drive), a magnetic stripe, a database, a server and other appropriate storage media. The storage 1003 may be referred to as an auxiliary storage apparatus.

The communication apparatus 1004 is hardware (transmission/reception device) that performs communication between computers via a wired and/or radio network, and is also referred to as, for example, a network device, a network controller, a network card and a communication module. The communication apparatus 1004 may be configured to include a high frequency switch, a duplexer, a filter and a frequency synthesizer to realize, for example, Frequency Division Duplex (FDD) and/or Time Division Duplex (TDD). For example, the above transmission/reception antennas 101 (201), amplifying sections 102 (202), transmission/reception sections 103 (203) and channel interface 106 may be realized by the communication apparatus 1004.

The input apparatus 1005 is an input device (e.g., a keyboard, a mouse, a microphone, a switch, a button or a sensor) that accepts an input from an outside. The output apparatus 1006 is an output device (e.g., a display, a speaker or a Light Emitting Diode (LED) lamp) that sends an output to the outside. In addition, the input apparatus 1005 and the output apparatus 1006 may be an integrated component (e.g., touch panel).

Furthermore, each apparatus such as the processor 1001 or the memory 1002 is connected by the bus 1007 that communicates information. The bus 1007 may be composed of a single bus or may be composed of buses that are different between apparatuses.

Furthermore, the radio base station 10 and the user terminal 20 may be configured to include hardware such as a microprocessor, a Digital Signal Processor (DSP), an Application Specific Integrated Circuit (ASIC), a Programmable Logic Device (PLD) and a Field Programmable Gate Array (FPGA). The hardware may realize part or all of each function block. For example, the processor 1001 may be implemented by at least one of these types of hardware.

Modified Example

In addition, each term that is described in this description and/or each term that is necessary to understand this description may be replaced with terms having identical or similar meanings. For example, a channel and/or a symbol may be signals (signaling). Furthermore, a signal may be a message. A reference signal can be also abbreviated as an RS (Reference Signal), or may be also referred to as a pilot or a pilot signal depending on standards to be applied. Furthermore, a Component Carrier (CC) may be referred to as a cell, a frequency carrier and a carrier frequency.

Furthermore, a radio frame may include one or a plurality of periods (frames) in a time domain. Each of one or a plurality of periods (frames) that composes a radio frame may be referred to as a subframe. Furthermore, the subframe may include one or a plurality of slots in the time domain. Furthermore, the slot may include one or a plurality of symbols (Orthogonal Frequency Division Multiplexing (OFDM) symbols or Single Carrier Frequency Division Multiple Access (SC-FDMA) symbols) in the time domain.

The radio frame, the subframe, the slot and the symbol each indicate a time unit for transmitting signals. The other corresponding names may be used for the radio frame, the subframe, the slot and the symbol. For example, one subframe may be referred to as a Transmission Time Interval (TTI), a plurality of contiguous subframes may be referred to as TTIs, or one slot may be referred to as a TTI. That is, the subframe or the TTI may be a subframe (one ms) according to legacy LTE, may be a period (e.g., 1 to 13 symbols) shorter than one ms or may be a period longer than one ms.

In this regard, the TTI refers to, for example, a minimum time unit of scheduling for radio communication. For example, in the LTE system, the radio base station performs scheduling for allocating radio resources (a frequency bandwidth or transmission power that can be used by each user terminal) in TTI units to each user terminal. In this regard, a definition of the TTI is not limited to this. The TTI may be a transmission time unit of a channel-coded data packet (transport block), or may be a processing unit of scheduling or link adaptation.

The TTI having the time duration of one ms may be referred to as a general TTI (TTIs according to LTE Rel. 8 to 12), a normal TTI, a long TTI, a general subframe, a normal subframe or a long subframe. A TTI shorter than the general TTI may be referred to as a reduced TTI, a short TTI, a reduced subframe or a short subframe.

Resource Blocks (RBs) are resource allocation units of the time domain and the frequency domain, and may include one or a plurality of contiguous subcarriers in the frequency domain. Furthermore, the RB may include one or a plurality of symbols in the time domain or may have the length of one slot, one subframe or one TTI. One TTI or one subframe may be each composed of one or a plurality of resource blocks. In this regard, the RB may be referred to as a Physical Resource Block (PRB: Physical RB), a PRB pair or an RB pair.

Furthermore, the resource block may be composed of one or a plurality of Resource Elements (REs). For example, one RE may be a radio resource domain of one subcarrier and one symbol.

In this regard, structures of the above radio frame, subframe, slot and symbol are only exemplary structures. For example, configurations such as the number of subframes included in a radio frame, the number of slots included in a subframe, the numbers of symbols and RBs included in a slot, the number of subcarriers included in an RB, the number of symbols in a TTI, a symbol length and a Cyclic Prefix (CP) length can be variously changed.

Furthermore, the information and parameters described in this description may be expressed by absolute values, may be expressed by relative values with respect to predetermined values or may be expressed by other corresponding information. For example, a radio resource may be indicated by a predetermined index. Furthermore, numerical expressions that use these parameters may be different from those explicitly disclosed in this description.

Names used for parameters in this description are by no means restrictive ones. For example, various channels (the Physical Uplink Control Channel (PUCCH) and the Physical Downlink Control Channel (PDCCH)) and information elements can be identified based on various suitable names. Therefore, various names assigned to these various channels and information elements are by no means restrictive ones.

The information and the signals described in this description may be expressed by using one of various different techniques. For example, the data, the instructions, the commands, the information, the signals, the bits, the symbols and the chips mentioned in the above entire description may be expressed as voltages, currents, electromagnetic waves, magnetic fields or magnetic particles, optical fields or photons, or optional combinations of these.

Furthermore, the information and the signals can be output from a higher layer to a lower layer and/or from the lower layer to the higher layer. The information and the signals may be input and output via a plurality of network nodes.

The input and output information and signals may be stored in a specific location (e.g., memory) or may be managed by a management table. The input and output information and signals can be overwritten, updated or additionally written. The output information and signals may be deleted. The input information and signals may be transmitted to other apparatuses.

Notification of information is not limited to the aspect/embodiment described in this description and may be performed by other methods. For example, the information may be notified by physical layer signaling (e.g., Downlink Control Information (DCI) and Uplink Control Information (UCI)), higher layer signaling (e.g., Radio Resource Control (RRC) signaling, broadcast information (Master Information Blocks (MIBs) and System Information Blocks (SIBs)), and Medium Access Control (MAC) signaling), other signals or combinations of these.

In addition, the physical layer signaling may be referred to as Layer 1/Layer 2 (L1/L2) control information (L1/L2 control signal) or L1 control information (L1 control signal). Furthermore, the RRC signaling may be referred to as an RRC message, and may be, for example, an RRCConnectionSetup message or an RRCConnectionReconfiguration message. Furthermore, the MAC signaling may be notified by, for example, an MAC Control Element (MAC CE).

Furthermore, notification of predetermined information (e.g., notification of "being X") may be made not only explicitly but also implicitly (by, for example, not notifying this predetermined information or by notifying another information).

Decision may be performed based on a value (0 or 1) expressed by one bit, may be performed based on a boolean expressed by true or false or may be performed by comparing numerical values (e.g., comparison with a predetermined value).

Irrespectively of whether software is referred to as software, firmware, middleware, a microcode or a hardware description language or as other names, the software should be widely interpreted to mean a command, a command set, a code, a code segment, a program code, a program, a subprogram, a software module, an application, a software application, a software package, a routine, a subroutine, an object, an executable file, an execution thread, a procedure or a function.

Furthermore, software, commands and information may be transmitted and received via transmission media. When, for example, the software is transmitted from websites, servers or other remote sources by using wired techniques (e.g., coaxial cables, optical fiber cables, twisted pairs and Digital Subscriber Lines (DSL)) and/or radio techniques (e.g., infrared rays and microwaves), these wired techniques and/or radio technique are included in a definition of the transmission media.

The terms "system" and "network" used in this description are compatibly used.

In this description, the terms "Base Station (BS)", "radio base station", "eNB", "cell", "sector", "cell group", "carrier" and "component carrier" can be compatibly used. The base station is also referred to as a term such as a fixed station, a NodeB, an eNodeB (eNB), an access point, a transmission point, a reception point, a femtocell or a small cell in some cases.

The base station can accommodate one or a plurality of (e.g., three) cells (also referred to as sectors). When the base station accommodates a plurality of cells, an entire coverage area of the base station can be partitioned into a plurality of smaller areas. Each smaller area can provide communication service via a base station subsystem (e.g., indoor small base station (RRH: Remote Radio Head)). The term "cell" or "sector" indicates part or the entirety of the coverage area of the base station and/or the base station subsystem that provide communication service in this coverage.

In this description, the terms "Mobile Station (MS)", "user terminal", "User Equipment (UE)" and "terminal" can be compatibly used. The base station is also referred to as a term such as a fixed station, a NodeB, an eNodeB (eNB), an access point, a transmission point, a reception point, a femtocell or a small cell in some cases.

The mobile station is also referred to by a person skilled in the art as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client or some other appropriate terms in some cases.

Furthermore, the radio base station in this description may be read as the user terminal. For example, each aspect/embodiment of the present invention may be applied to a configuration where communication between the radio base station and the user terminal is replaced with communication between a plurality of user terminals (D2D: Device-to-Device). In this case, the user terminal 20 may be configured to include the functions of the above radio base station 10. Furthermore, words such as "uplink" and "downlink" may be read as "sides". For example, the uplink channel may be read as a side channel.

Similarly, the user terminal in this description may be read as the radio base station. In this case, the radio base station 10 may be configured to include the functions of the above user terminal 20.

In this description, specific operations performed by the base station are performed by an upper node of this base station depending on cases. Obviously, in a network including one or a plurality of network nodes including the base stations, various operations performed to communicate with a terminal can be performed by base stations, one or more network nodes (that are supposed to be, for example, Mobility Management Entities (MME) or Serving-Gateways (S-GW) yet are not limited to these) other than the base stations or a combination of these.

Each aspect/embodiment described in this description may be used alone, may be used in combination or may be switched and used when carried out. Furthermore, orders of the processing procedures, the sequences and the flowchart according to each aspect/embodiment described in this description may be rearranged unless contradictions arise. For example, the method described in this description presents various step elements in an exemplary order and is not limited to the presented specific order.

Each aspect/embodiment described in this description may be applied to Long Term Evolution (LTE), LTE-Advanced (LTE-A), LTE-Beyond (LTE-B), SUPER 3G, IMT-Advanced, the 4th generation mobile communication system (4G), the 5th generation mobile communication system (5G), Future Radio Access (FRA), the New Radio Access Technology (New-RAT), New Radio (NR), New radio access (NX), Future generation radio access (FX), Global System for Mobile communications (GSM) (registered trademark), CDMA2000, Ultra Mobile Broadband (UMB), IEEE 802.11 (Wi-Fi (registered trademark)), IEEE 802.16 (WiMAX (registered trademark)), IEEE 802.20, Ultra-WideBand (UWB), Bluetooth (registered trademark), systems that use other appropriate radio communication methods and/or next-generation systems that are expanded based on these systems.

The phrase "based on" used in this description does not mean "based only on" unless specified otherwise. In other words, the phrase "based on" means both of "based only on" and "based at least on".

Every reference to elements that use names such as "first" and "second" used in this description does not generally limit the quantity or the order of these elements. These names can be used in this description as a convenient method for distinguishing between two or more elements. Hence, the reference to the first and second elements does not mean that only two elements can be employed or the first element should precede the second element in some way.

The term "deciding (determining)" used in this description includes diverse operations in some cases. For example, "deciding (determining)" may be regarded to "decide (determine)" "calculating", "computing", "processing", "deriving", "investigating", "looking up" (e.g., looking up in a table, a database or another data structure) and "ascertaining". Furthermore, "deciding (determining)" may be regarded to "decide (determine)" "receiving" (e.g., receiving information), "transmitting" (e.g., transmitting information), "input", "output" and "accessing" (e.g., accessing data in a memory). Furthermore, "deciding (determining)" may be regarded to "decide (determine)" "resolving", "selecting", "choosing", "establishing" and "comparing". That is, "deciding (determining)" may be regarded to "decide (determine)" some operation.

The words "connected" and "coupled" used in this description or every modification of these words can mean every direct or indirect connection or coupling between two or more elements, and can include that one or more intermediate elements exist between the two elements "connected" or "coupled" with each other. The elements may be coupled or connected physically, logically or by way of a combination of physical and logical connections. It can be understood that, when used in this description, the two elements are "connected" or "coupled" with each other by using one or more electric wires, cables and/or printed electrical connection, and by using electromagnetic energy having wavelengths in radio frequency domains, microwave domains and (both of visible and invisible) light domains in some non-restrictive and incomprehensive examples.

When the words "including" and "comprising" and modifications of these words are used in this description or the claims, these words intend to be comprehensive similar to the word "having". Furthermore, the word "or" used in this description or the claims intends not to be an exclusive OR.

The present invention has been described in detail above. However, it is obvious for a person skilled in the art that the present invention is not limited to the embodiment described in this description. The present invention can be carried out as modified and changed aspects without departing from the gist and the scope of the present invention defined by the recitation of the claims. Accordingly, the disclosure of this description intends for exemplary explanation, and does not have any restrictive meaning to the present invention.

This application claims priority to Japanese Patent Application No. 2016-215688 filed on Nov. 2, 2016, the entire contents of which are incorporated by reference herein.

The invention claimed is:

1. A user terminal comprising:
a reception section that receives a first synchronization signal and a second synchronization signal mapped on predetermined resources; and
a control section that controls synchronization processing based on the first synchronization signal and the second synchronization signal,
wherein spacings of the first synchronization signal and the second synchronization signal at which the first synchronization signal and the second synchronization signal are mapped on subcarriers are different.

2. The user terminal according to claim 1, wherein the first synchronization signal and the second synchronization signal are applied a same transmission bandwidth and subcarrier spacing.

3. The user terminal according to claim 1, wherein the first synchronization signal has a shorter sequence length and the wider spacing at which the first synchronization signal is mapped on the subcarrier than those of the second synchronization signal.

4. The user terminal according to claim 3, wherein the second synchronization signal is mapped on contiguous subcarriers or a subcarrier arranged per predetermined spacing.

5. The user terminal according to claim 1, wherein an identical numerology to that of the first synchronization signal and/or the second synchronization signal, or a scaled numerology is used to detect at least one of a broadcast channel and a reference signal.

6. The user terminal according to claim 1, wherein the first synchronization signal is formed by one pattern, and the second synchronization signal is formed based on a number of patterns corresponding to a number of cell IDs.

7. A radio communication method of a user terminal that communicates with a radio base station, the radio communication method comprising:
a step of receiving a first synchronization signal and a second synchronization signal mapped on predetermined resources; and
a step of controlling synchronization processing based on the first synchronization signal and the second synchronization signal,
wherein spacings of the first synchronization signal and the second synchronization signal at which the first synchronization signal and the second synchronization signal are mapped on subcarriers are different.

8. The user terminal according to claim 2, wherein the first synchronization signal has a shorter sequence length and the wider spacing at which the first synchronization signal is mapped on the subcarrier than those of the second synchronization signal.

9. The user terminal according to claim 2, wherein an identical numerology to that of the first synchronization signal and/or the second synchronization signal, or a scaled numerology is used to detect at least one of a broadcast channel and a reference signal.

10. The user terminal according to claim 3, wherein an identical numerology to that of the first synchronization signal and/or the second synchronization signal, or a scaled numerology is used to detect at least one of a broadcast channel and a reference signal.

11. The user terminal according to claim 4, wherein an identical numerology to that of the first synchronization signal and/or the second synchronization signal, or a scaled numerology is used to detect at least one of a broadcast channel and a reference signal.

12. The user terminal according to claim 2, wherein the first synchronization signal is formed by one pattern, and the second synchronization signal is formed based on a number of patterns corresponding to a number of cell IDs.

13. The user terminal according to claim 3, wherein the first synchronization signal is formed by one pattern, and the second synchronization signal is formed based on a number of patterns corresponding to a number of cell IDs.

14. The user terminal according to claim 4 wherein the first synchronization signal is formed by one pattern, and the second synchronization signal is formed based on a number of patterns corresponding to a number of cell IDs.

15. The user terminal according to claim 5, wherein the first synchronization signal is formed by one pattern, and the second synchronization signal is formed based on a number of patterns corresponding to a number of cell IDs.

* * * * *